(12) United States Patent
Dhua et al.

(10) Patent No.: US 10,049,308 B1
(45) Date of Patent: Aug. 14, 2018

(54) SYNTHESIZING TRAINING DATA

(71) Applicant: A9.com, Inc., Palo Alto, CA (US)

(72) Inventors: Arnab Sanat Kumar Dhua, Mountain View, CA (US); Ming Du, Fremont, CA (US); Aishwarya Natesh, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 2 days.

(21) Appl. No.: 15/438,652

(22) Filed: Feb. 21, 2017

(51) Int. Cl.
| | |
|---|---|
| *G06K 9/60* | (2006.01) |
| *G06K 9/66* | (2006.01) |
| *G06K 9/46* | (2006.01) |
| *G06K 9/62* | (2006.01) |
| *G06T 11/60* | (2006.01) |
| *G06T 7/194* | (2017.01) |
| *G06T 7/90* | (2017.01) |
| *G06T 7/73* | (2017.01) |
| *G06N 3/08* | (2006.01) |

(52) U.S. Cl.
CPC ............. *G06K 9/66* (2013.01); *G06K 9/4628* (2013.01); *G06K 9/628* (2013.01); *G06K 9/6256* (2013.01); *G06N 3/08* (2013.01); *G06T 7/194* (2017.01); *G06T 7/73* (2017.01); *G06T 7/90* (2017.01); *G06T 11/60* (2013.01); *G06K 2009/4666* (2013.01); *G06T 2207/10024* (2013.01); *G06T 2207/20036* (2013.01); *G06T 2207/20081* (2013.01); *G06T 2207/20084* (2013.01); *G06T 2207/20221* (2013.01)

(58) Field of Classification Search
None
See application file for complete search history.

(56) References Cited

U.S. PATENT DOCUMENTS

| | | | | | |
|---|---|---|---|---|---|
| 5,475,507 | A  * | 12/1995 | Suzuki | ...................... | G06T 7/12 358/500 |
| 7,236,623 | B2 * | 6/2007 | Chapoulaud | ....... | G01N 15/1475 382/133 |
| 7,978,917 | B2 * | 7/2011 | Lei | ...................... | G06K 9/00771 375/240.08 |
| 7,991,229 | B2 * | 8/2011 | Xiao | ................... | H04N 1/40062 382/176 |
| 8,013,870 | B2 * | 9/2011 | Wilensky | .............. | G06T 15/503 345/592 |
| 8,737,703 | B2 * | 5/2014 | Mangoubi | .......... | G06K 9/00617 382/128 |

(Continued)

*Primary Examiner* — Jayesh A Patel
(74) *Attorney, Agent, or Firm* — Hogan Lovells US LLP

(57) ABSTRACT

Training images can be synthesized in order to obtain enough data to train a convolutional neural network to recognize various classes of a type of item. Images can be synthesized by blending images of items labeled using those classes into selected background images. Catalog images can represent items against a solid background, which can be identified using connected components or other such approaches. Removing the background using such approaches can result in edge artifacts proximate the item region. To improve the results, one or more operations are performed, such as a morphological erosion operation followed by an opening operation. The isolated item portion then can be blended into a randomly selected background region in order to generate a synthesized training image. The training images can be used with real world images to train the neural network.

20 Claims, 9 Drawing Sheets

(56) References Cited

U.S. PATENT DOCUMENTS

| | | | | |
|---|---|---|---|---|
| 8,823,745 B2* | 9/2014 | Francois | | G06T 7/194 |
| | | | | 345/638 |
| 8,934,670 B2* | 1/2015 | Feris | | G06T 7/2053 |
| | | | | 348/143 |
| 9,349,198 B2* | 5/2016 | Claus | | G06T 11/005 |
| 2003/0202697 A1* | 10/2003 | Simard | | G06K 9/00456 |
| | | | | 382/195 |
| 2004/0062439 A1* | 4/2004 | Cahill | | G06T 5/50 |
| | | | | 382/173 |
| 2004/0151342 A1* | 8/2004 | Venetianer | | G06K 9/00624 |
| | | | | 382/103 |
| 2006/0045357 A1* | 3/2006 | Schwartz | | H04N 19/503 |
| | | | | 382/232 |
| 2007/0195993 A1* | 8/2007 | Chen | | H04N 19/60 |
| | | | | 382/103 |
| 2008/0122858 A1* | 5/2008 | Wilensky | | G06T 15/503 |
| | | | | 345/592 |
| 2008/0181499 A1* | 7/2008 | Yang | | G06T 7/12 |
| | | | | 382/174 |
| 2008/0247599 A1* | 10/2008 | Porikli | | G06K 9/00771 |
| | | | | 382/103 |
| 2009/0060354 A1* | 3/2009 | Xiao | | H04N 1/40062 |
| | | | | 382/232 |
| 2009/0110236 A1* | 4/2009 | Huang | | G06T 7/254 |
| | | | | 382/103 |
| 2012/0027248 A1* | 2/2012 | Feris | | G06K 9/00744 |
| | | | | 382/103 |
| 2015/0010209 A1* | 1/2015 | Feris | | G06T 7/2053 |
| | | | | 382/103 |
| 2016/0180565 A1* | 6/2016 | Moore | | G06F 3/0484 |
| | | | | 715/255 |
| 2016/0191398 A1* | 6/2016 | Okada | | H04L 47/283 |
| | | | | 370/229 |
| 2017/0139573 A1* | 5/2017 | Li | | G06F 3/04845 |
| 2018/0033152 A1* | 2/2018 | Chen | | G06K 9/00711 |

* cited by examiner

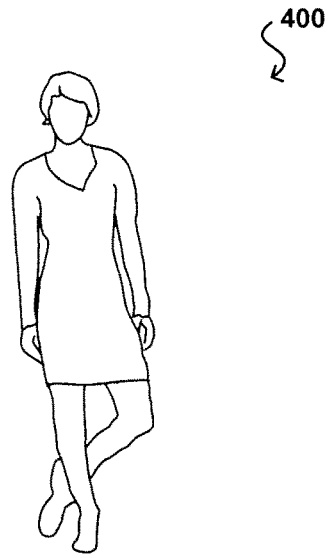 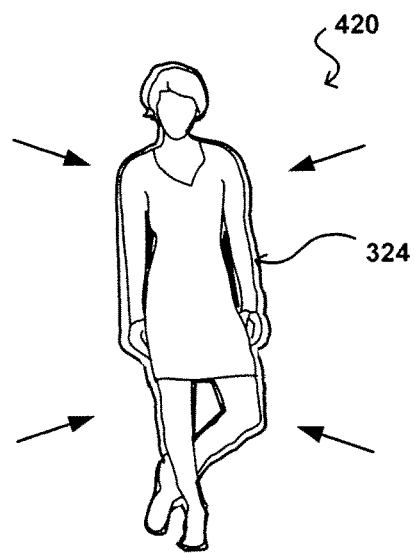
FIG. 4A          FIG. 4B
 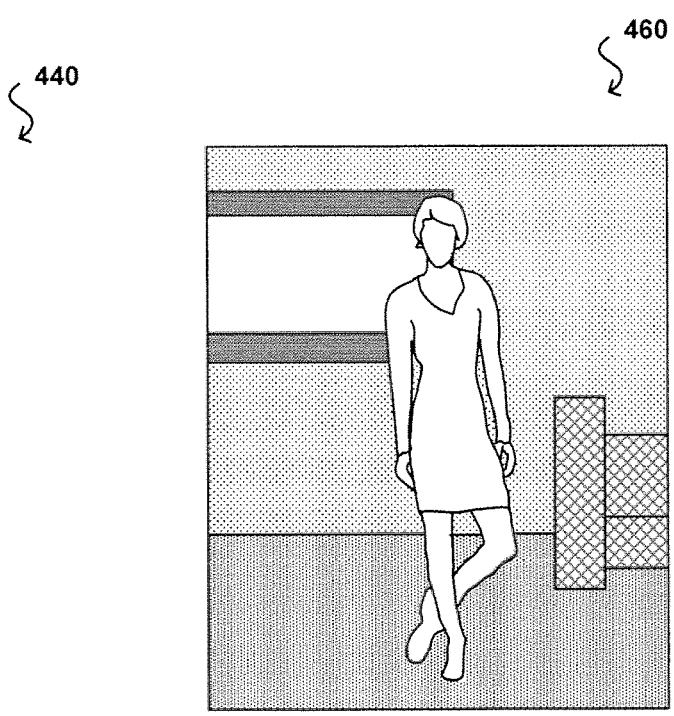
FIG. 4C          FIG. 4D

SYNTHESIZING TRAINING DATA

BACKGROUND

Users are increasingly consuming content electronically, such as by accessing digital content provided over the Internet or another such network. Users often rely upon search queries or keyword strings that can be used to identify potentially relevant content. In many instances, however, the relevance depends at least in part to the actual query that was submitted, as well as the way in which the potentially relevant content is categorized or identified. Providers are beginning to look towards machine learning and artificial intelligence for assistance in classifying content. In order to properly train a machine learning algorithm, however, there must be sufficient data available for each appropriate class or sub-class. The need to attempt to obtain and classify content for a large variety of classes, and sub-classes, can be daunting at best and in many instances can prevent machine learning from being utilized in a way that provides satisfactory results to users.

BRIEF DESCRIPTION OF THE DRAWINGS

Various embodiments in accordance with the present disclosure will be described with reference to the drawings, in which:

FIGS. 4A, 4B, 4C, and 4D illustrate an approach to reducing artifacts in synthesized images that can be utilized in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing content in an electronic environment. In particular, various embodiments providing for the synthesizing of images useful in training convolutional neural networks and other machine learning algorithms. Deep learning approaches generally require a significant amount of training data to achieve satisfactory performance. Acquiring good quality training data using conventional approaches is very expensive and time-consuming. In order to obtain the amount of data needed for accurate training, approaches in accordance with various embodiments can synthesize training images by blending images of the classes of items into background images to generate items useful for training. The item images can be catalog images that by design are represented against a solid background that is generally not optimal for training a neural network to process real world images. Accordingly, the background portions of the catalog images can be removed to include only the item portions. Unfortunately, removing the background is not a straightforward process and artifacts of the removal may be left near the edges of the item region that can negatively impact the accuracy of the training and subsequent classification. To improve the results, one or more morphological operations can be performed on the mask in order to reduce the artifacts present in the item regions. This can include, for example, an erosion operation followed by an opening operation, among other such options. This can substantially remove the artifact regions. Although some amount of the item region may be removed as well, the remaining portion should still be sufficient for adequately training the neural network. The isolated item portion can be blended into a randomly selected background region in order to generate a synthesized training image. A set of such images can be generated such that between the real world images and the synthesized images there are a sufficient number of images to classify the neural network for each relevant class or subclass.

Various other functions can be implemented within the various embodiments as well as discussed and suggested elsewhere herein.

Figure 1:
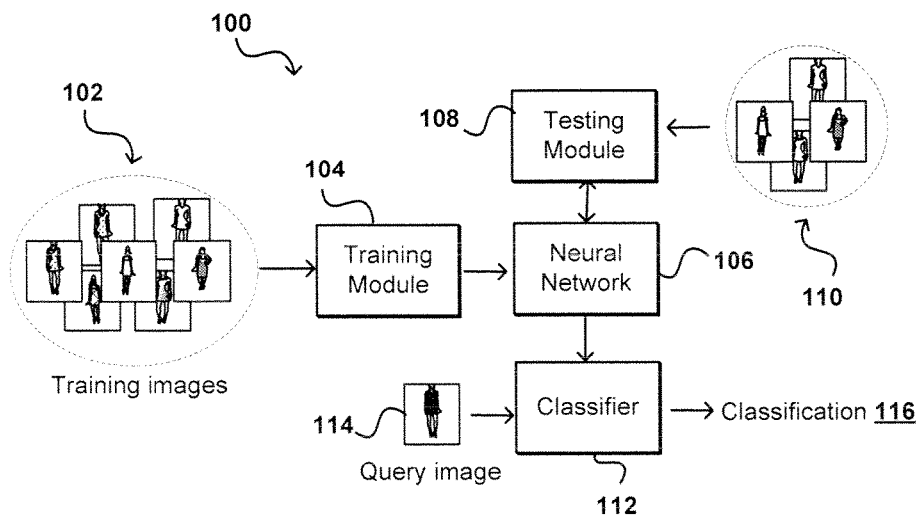
FIG. 1 illustrates an example approach to training and utilizing a neural network to classify content that can be utilized in accordance with various embodiments.

FIG. 1 illustrates an example classification pipeline 100 that can be utilized in accordance with various embodiments. In this example, a set of images 102 is obtained that can be used to train one or more neural networks 106 to recognize various types of items represented in those images. These images can come from one or more sources, such as from a content provider, the Internet, an electronic catalog, or a social media site, and can include representations of various different types of items. In order to function as training data for one or more neural networks, or other such machine learning algorithms, etc., at least some of the images will include (or be associated with) data that indicates a type or label of item represented in each image. For example, an image showing a formal gown might include metadata such as "women's formal gown," or another such label. The labels in at least some embodiments will be selected from a set of classes, or sub-classes, used to identify various types of items.

In some embodiments the set of images will be analyzed to determine which images include data sufficient to identify a type of item represented in each of those images, and those images can be considered a training set to be used to train the neural networks. In at least some embodiments there is one neural network trained for each type of item, with multiple types of classifications of that type of item being possible outcomes from the network. In some embodiments a portion of the training set will be retained as a testing set 110 to use to test the accuracy of the trained neural network. In this example, the training images are accessible to a training module 104 which can feed the images to a neural network 106 in order to train the network. As mentioned, the image and class label data will be fed to the neural network so the neural network can learn features of items associated with different classes of items. The network can then learn various combinations or relations of features for different classes, such that when a query image is processed with the trained neural network the network can recognize the features and output the appropriate classification, although various other approaches can be utilized as well within the scope of the various embodiments.

In some embodiments the training images 102 are to be used as training data for a convolutional neural network or other deep neural network. As mentioned, the images can be labeled, either when provided or through a labeling analysis, to determine a primary class, such as a woman's dress. If provided by a user, information such as the keywords in the query or other information provided by the user can be used to label and/or select the image for training. Various other images provided by third party sources can be used for training as well as discussed and suggested elsewhere herein. The neural network can be trained using some or all of the designated training data. Once at least the initial training has completed, a testing module 108 can utilize the testing images 110 to test the trained neural network. Since the testing images already include class label data, the classifications generated by the neural network can be compared against that data to determine the accuracy of the neural network, both overall and for different categories of items. The testing images can also be used to further train the neural network. The results can be analyzed and if the results are acceptable, such as where the accuracy at least meets a minimum accuracy threshold for some or all of the classifications, the neural network can be provided to a classifier 112 that is able to accept query images 114 from various sources, such as customers or end users, and generate classifications 116 for items represented in those images. The query images might also come from the provider itself, for use in an electronic catalog or otherwise. As mentioned later herein, such an approach can be used for a number of different purposes, such as to classify items offered for consumption (i.e., purchase, rent, or otherwise obtain) through an electronic marketplace, where the item represented might not be classified, might have improper classification, or might provide classification per a different scheme, etc.

In some embodiments deep neural networks can be trained using a set of training images exhibiting different class labels for items and including information detailing those label selections. In other embodiments, generative adversarial networks (GANs) can be used that do not require the data seeding used for training deep neural networks. Various other approaches can be used as well as discussed and suggested elsewhere herein. Deep neural networks, or deep learning, can involve representing images or other content items as vectors or sets of edges or regions to simplify the learning task. These processes can allow for unsupervised learning and hierarchical feature extraction, among other such options. Deep learning algorithms can transform these inputs through multiple layers of transformation to describe causal connections between input and output. GANs can estimate a general model of such inputs using an adversarial process, as may utilize a generative model and a discriminative model. The discriminative model discriminates between different classes of data, such as a convolutional neural network trained to provide different outputs for different recognized classes. The generative model generates new data that fits the distribution of the training data. The generative model can be, for example, a Gaussian mixture model that can generate a set of points which approximately fit the training data. Various other networks or trained models can be used as well within the scope of the various embodiments. For approaches that require seeding, there can be a set of training data defined or otherwise generated for each attribute applied for a given category. The attributes can be defined by an administrator or other authorized entity, or can be learned algorithmically based on user queries, among other such options.

In order for the neural network to provide sufficient accuracy, the neural network will in many cases need to process enough images of each type or class of item to be able to accurately recognize those types of items. For items such as apparel items that can have many different sub-categories or sub-classes, this may require a very large set of training images. As the number of categories increases, or the number of sub-category divisions increases, the total number of images needed to train the neural network will in most cases increase as well. In order to ensure accuracy, the training images will need to include an appropriate label for the item(s) represented. This can be quite burdensome and expensive, as it can be difficult to generate or obtain a sufficient number of labeled images of each class of item. In many cases the labeling will involve at least one human examining each image. The problem is exacerbated by the fact that as the classes become more granular it will be increasingly difficult for the person to be able to determine the appropriate class. Further, for applications such as mobile visual search the problem becomes further complicated because outfits worn by actual people can become increasingly complex, with a wide range of backgrounds and other conditions. In addition to obtaining sufficient training data, it is necessary in at least some embodiments to obtain training images with a variety of background such that the network can recognize the item represented independent of the other information contained in the image or represented in the scene.

Accordingly, approaches in accordance with various embodiments can attempt to generate or "synthesize" training images for use in training one or more neural networks or other machine learning algorithms. Such approaches can take representations of labeled items, such as apparel items, and remove the background region(s) from those images. The item representations can then be pasted over, or inserted into, images including various backgrounds to generate additional training images of varying complexity and composition. Such an approach can help to not only provide more training data, but also to provide more variety in background combinations and the like. While three dimensional models and other approaches can be utilized as discussed herein, using two-dimensional techniques in many instances is sufficient to train the neural network for various classes of items as may be represented in a variety of different situations. In some embodiments the synthesized images are used to train deep learned apparel-type classifiers that can be used for a variety of different purposes. In at least some embodiments, the synthesized images can be used alongside real world images in order to obtain even more accurate classification results.

When generating training images for training of a neural network, the images do not need to be realistic to the human eye. This can help to simplify the process and reduce the resources needed, as the synthesized images do not need to be photorealistic. There are certain artifacts, however, that may impact the accuracy of the training, particularly for artifacts that are repeated or present in multiple training images. This can result, for example, from procedures that attempt to remove the background pixels from consideration but are not sufficiently thorough in the removal.

Figures 2A, 2B:
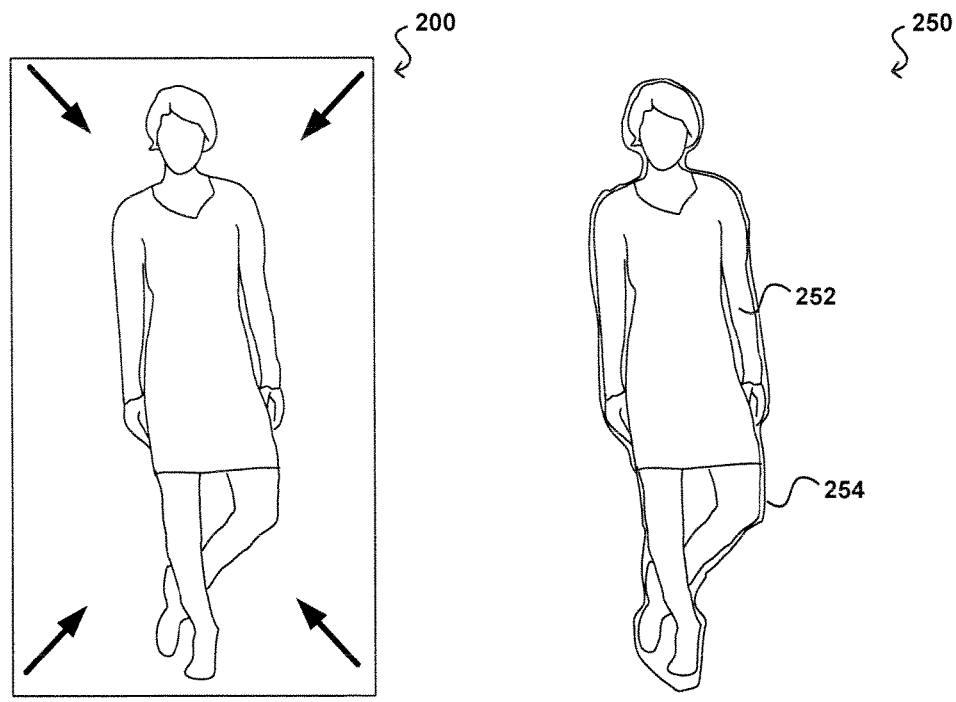
FIGS. 2A and 2B illustrate an approach to removing background pixels from a training image that can be utilized in accordance with various embodiments.

For example, consider the example background removal process illustrated in FIGS. 2A and 2B. In this example process, the item images to be used to generate synthesized images are catalog images where the item(s) are displayed against a white background, as in the image 200 of FIG. 2A. Accordingly, one way to remove the background is to start at the corners of the image, where representation of the item is very unlikely to be located, and move inward removing from consideration all pixels that have the background color, such as have a while pixel value of 255. As used herein, pixels can be removed from consideration in a number of different ways, such as by cropping the image to exclude those pixels or setting those pixels to be transparent, among other such options. Various approaches can be used to determine the connected background region(s), as may include connected components or other such approaches.

FIG. 2B illustrates an example image region 250 where the white background pixels have been removed from consideration. As with many images, however, there will be some amount of anti-aliasing or smoothing near the edges of the item, where the pixel values will be a combination of the background color and the item color. This technique helps to smooth out what would otherwise be jagged edges of items due to the limited number or resolution of pixels in the image. Since these pixels will not have the background color, however, they can be excluded from the background portion removed from consideration. This can result in an edge region 254 being included around the represented item 252 in the image data. Similar regions can be included as well, as may result from regions 256 representing shadows or lighting effects, or regions 258 within the item representation that are isolated from the corner regions. Various other regions may be represented as well, which can leave halos or other non-item regions present in the image.

Figure 3A:
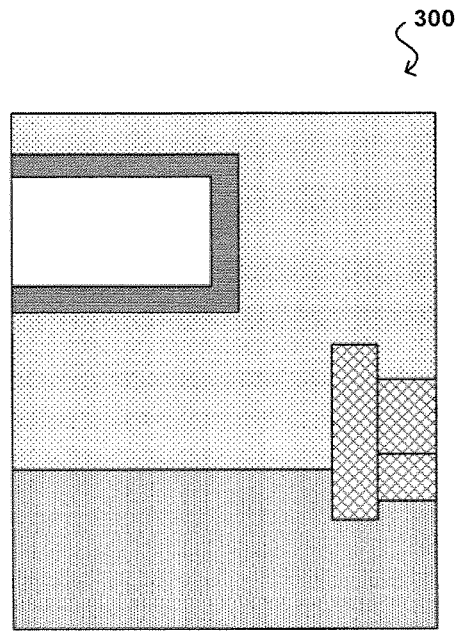
FIGS. 3A, 3B, and 3C illustrate an example approach to synthesizing training images that can be utilized in accordance with various embodiments.
Figure 3B:
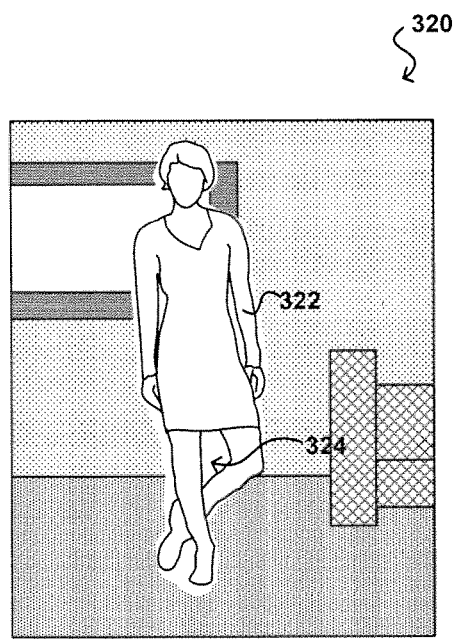

Problems can arise when these halos, edge regions, or other non-item portions are used to train the neural networks. Consider the background image 300 illustrated in FIG. 3A. There are various shades, textures, and shapes that are part of the background. If the item portion 322, including the non-item regions 324, is layered onto or pasted into the background image to generate a synthesized image 320, as illustrated in the example of FIG. 3B, the neural network may determine that the non-item region is part of the item itself. This may particularly be the case if several images are used for training that all demonstrate such an artifact. If a query image is subsequently received that does not contain such an artifact then the neural network may not properly classify the item.

Accordingly, approaches discussed and suggested herein can attempt to reduce the presence of these artifacts in order to minimize their impact on the training of the neural network, as well as to improve the classifications generated by a network trained on these images. One approach is to remove large regions of the background color that might be within the item region. For example, the region 324 between the legs of the person in the image can be comprised of mostly pixels having the background color, such that those regions can be classified as background and excluded. Real item portions will typically have at least some variation in color, such that those regions will be less likely to be excluded. Additional steps thus can be taken to further reduce the amount of non-item pixels contained in the item portion 322 of the image. As illustrated, however, there will still be some amount of non-item artifact proximate the edges of the item, person, or other object represented in the foreground portion of the image.

Figure 3C:
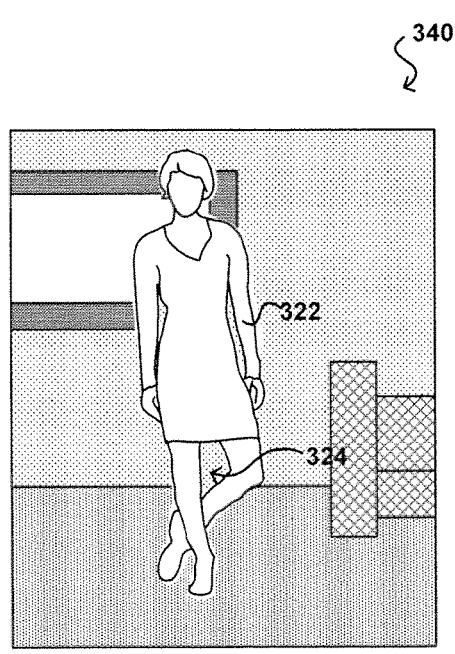

Approaches in accordance with various embodiments can attempt to minimize the presence of these artifacts using the foreground item region identified using some or all of the approaches discussed previously. For example, the item portion 400 of the labeled image can be isolated, with slight artifacts, as illustrated in FIG. 4A. This can correspond to the portion illustrated in FIG. 3C, which demonstrates some amount of edge artifact when superimposed over the background image. Using the boundary of that region as a mask boundary, or otherwise selecting only that region for processing, approaches in accordance with various embodiments can further remove from consideration a number of pixels 324 around an edge of the item region, as illustrated in the image example 420 of FIG. 4B. Such an approach can remove most or all of the anti-aliasing and other artifacts present around the edge of the item. As illustrated, however, such an approach will likely also remove from consideration at least a portion of the outer edge of the item itself. This can result in a smaller (i.e., thinner and shorter) image 440, as illustrated in FIG. 4C, which includes only a central portion of the item represented in the image. Such an approach would not be ideal for images that are to be presented to human viewers, for example, as the representation may look odd for cropping off the edges of the item. Further, producers of the item may object to its presentation in such a way. For training a neural network, however, the fact that a small outer edge of the item is not included in the synthesized image will have little to no impact on the accuracy of the network, as verified through experimentation, but can be almost entirely free of edge artifacts due to antialiasing and other such aspects, as illustrated in the example image 460 of FIG. 4D, where the "thinned" image has been added as a foreground layer to the background image. Such synthesized image can be saved as a single image file that can then be fed to a training module, or other such system or service, for use in training a neural network for items of this class. It should also be stated that any class or labeling metadata or other such information can also be stored or otherwise associated with the synthesized image, such that the neural network can be trained using the synthesized image even though the background image may have no such classification data. As discussed elsewhere herein, the metadata of the background image can be used to identify objects in the background, which can be used to select or exclude certain background images for consideration for synthesized training images.

In various embodiments, background images are selected from a set of possible background images based on one or more criteria. These criteria can include, for example, that the image includes an indoor or outdoor scene, and not a representation of another object, as that may create confusion as to which item(s) or object(s) in the image correspond to the object for training. Further, scene images that include other persons or items (i.e., apparel items for apparel training) may be excluded as well for similar reasons. There may be other criteria as well, such as minimum or maximum size or resolution, brightness, contrast, and the like. For images with annotations or metadata indicating what is represented, this data can be used to select and/or exclude background images for consideration. In some embodiments, the images can also be processed using face detectors, object recognition algorithms, or other such approaches to attempt to determine background images that include representations of persons or objects that should cause those images to be excluded from consideration. In some embodiments the selection can be further based on the ability to locate an affordance region in the image. An "affordance" region as utilized herein refers to a location where a person might typically be represented in an image, such as may involve standing on a floor, ground, grass, sidewalk, path, road, land, sand, snow, carpet, runway, or field, among other such options. While an image showing a sky, sea, or galaxy might qualify as a background image, images including persons in front of those backgrounds are very unlikely and it may be preferable to utilize backgrounds that are similar to the types of backgrounds that will actually be encountered in real world query images. Further, aspects such as scale and location can be used in some embodiments such that item images including an entire person might be selected for backgrounds including a floor to ceiling view, while item images of just a shirt or shorts might include a representation of a much smaller region, among other such options. In some embodiments images can be analyzed to attempt to remove substantially redundant images, to avoid training on features of that type of background. Similarly, sub-regions of the various background images may be selected in at least some embodiments to further differentiate the backgrounds in the various synthesized images, such as where a single background might be used for ten different item images, but different regions of that background selected for each synthesized image. The selection can be performed randomly in some embodiments, or according to a selection algorithm in others.

At least some pre-processing of the item images can be performed before the synthesizing as well. In some embodiments, processing of the background color can be performed. For example, catalog images might be generated to have a white background, but in practice the actual pixel values for the background pixels may not all be exactly the determined value, such as 255 white. Accordingly, in some embodiments a threshold or range of background colors may be set, such as may include any pixels with pixel values of at least 250 on a 0-255 black to white scale. In some embodiments pixels over this threshold may be excluded from consideration, or included in the connected components analysis, while in other embodiments the pixel values over 250 might all be set to 255 before analysis, among other such options. Additional processing can be performed for regions where shadows may be anticipated, such as around bottom edges of an item representation and that have slightly gray coloration. These regions can potentially be considered background as well, and processed accordingly.

While such approaches can help to reduce the presence of background pixels, or other non-item pixels included in the image region, there can still be artifacts due to antialiasing and other effects as discussed elsewhere herein. In one approach, a blending approach (e.g., alpha blending) can be used to attempt to reduce the presence of these artifacts. A binary mask generated using the determined background pixel locations can be determined that will differ from the item pixel locations by primarily the region of artifacts. An amount of blending can be performed at this region, to attempt to create a smooth transition instead of an abrupt change at the edge of the mask where the pixel values are excluded from consideration. In some embodiments the blending can be performed by blurring the binary mask with a Gaussian kernel. The size of the kernel can be determined using a fraction of the dimensions of the mask itself. Such an approach can be equivalent to a gradual alpha blending between the foreground and the background at the mask boundaries. This can result in the white halo around the item being faded or reduced in appearance, which can help with the training of a convolutional neural network using the synthesized images. There will still be at least some of the artifact present in the synthesized image, however, which may still lead to at least some amount of inaccuracy in the training.

Accordingly, additional and/or alternative steps can be used to attempt to remove or at least further reduce the presence of such artifacts in the synthesized images. In various embodiments, one or more morphological operations can be performed on the mask to attempt to remove the remaining background pixels. The morphological operations can include operations such as opening, erosion, and/or dilation, among other such options. The operations can also include combinations or sequences of these operations. For example, an approach in accordance with one embodiment utilizes an erosion followed by an opening operation, where the opening involves both an erosion and a dilation. In this example, the initial erosion is performed using a slightly larger structuring element than is used for the opening operation. The erosion process involves removing pixels from around an edge using a structuring element or tool that makes the object thinner and can in at least some embodiments also smooth the edge based at least in part upon the size and shape of the tool. The second erosion also makes the object smaller by taking away some of the edge information, followed by a dilation that adds some thickness back, such as by blending or extending the pixel values near the edge. Both morphological operations can be performed using structuring elements (e.g., circles) that are a fraction of the size of the overall mask dimensions. As mentioned, the second erosion and dilation can utilize a smaller structuring element in order to generate a finer edge that would otherwise result from the first erosion, but the first erosion will remove a significantly larger portion of the artifact region. In embodiments that utilize alpha blending, the morphological operation(s) can be performed before the alpha blending, such that the artifact can be substantially removed before alpha blending is performed to remove any resulting jagged edge regions due to the background mask. While the removal of shadow regions and intra-item regions may not be perfect, these artifacts will differ appreciably between images such that there should be no significant impact on the overall training of the model. The impact has been verified through experimentation. The morphological processing discussed herein can generate a mask that enables the item image region to be blended into the background image with minimal detectable artifacts that would impact the network training.

In some embodiments additional processing can be performed to further improve the accuracy of the training using the synthesized images. For example, scaling can be applied to attempt to match the scale of an object to the scale of the background to provide more realistic images. The scale in some embodiments can be determined by processing the background with an object identification algorithm and then determining the apparent size of that object in the image. Further, lighting, contrast, and/or coloration adjustments can be made to improve realism as well. In some embodiments there can be a relighting attempted for the synthesized image to attempt to improve the overall appearance and realism. Depending upon the realism of the synthesized images, these images can also be utilized for other purposes as well, such as to show how various items would look in different locations. This can be useful to view furniture in different locations, outfits in different locations, and the like. Further, such approaches can help to provide variety for content providers who source images for various purposes. Further, in some embodiments the background image can be blurred such that primarily colors and basic shapes are visible instead of identifiable objects. Such an approach can help with lighting, contrast, and other such aspects while still providing adequate differentiation between the backgrounds.

In some embodiments the item image will also be analyzed to determine an appropriate placement of the item representation with respect to the background. For example, an image of an entire person might be centered in a background image or positioned relative to the affordance, but if the item image is such that the image cuts off at the neck and no head is shown then the item should be placed near the top of the image instead of in the center, such that there is no significant gap between the neck cutoff and the top of the image. Similarly, if the item is a pair of shorts but the image is cut off at the person's knees, then the item image should be placed towards the bottom of the background image. The image can also be scaled appropriately to either correspond to the background or take up a reasonable amount of the space of the image, among other such options.

Figure 5A:
FIGS. 5A and 5B illustrate example interfaces that can enable a user to locate items of a similar classification that can be utilized in accordance with various embodiments.
Figure 5B:
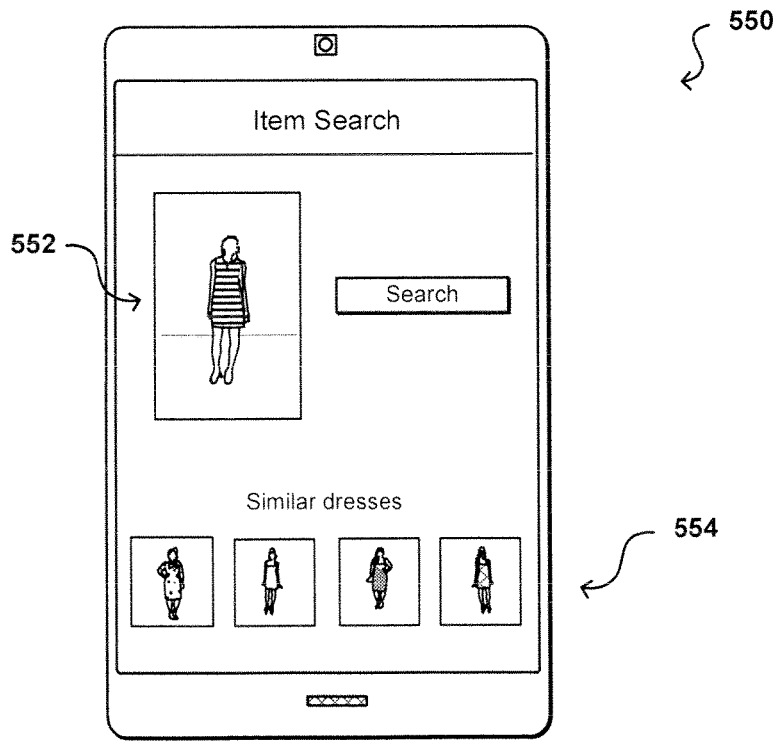

Once trained, a neural network can classify received query images. The classifications can then be used for any of a number of different purposes, such as to locate other items with that classification. For example, FIG. 5A illustrates an interface 500 wherein a query image has been processed and the represented item identified, such that information 502 about that item scan be presented for display. Because the item has also been classified, content for a number of related items 504 can be displayed as well, which enables the user to quickly locate other versions of that item. Similarly, FIG. 5B illustrates another example interface 550 that can be utilized in accordance with various embodiments. In this example, a query image 552 has been provided and instead of displaying information about that item, which may or may not be available, the interface displays content for result items 554 that are of the same classification as the item represented in the query image. In this way, the user can capture (or otherwise obtain) a real world image of an item of interest and obtain results for items of the same classification. Here, the items are dresses of the same classification. In this example the user can then be able to view available dresses of that classification that are available for purchase, etc.

Figure 6:
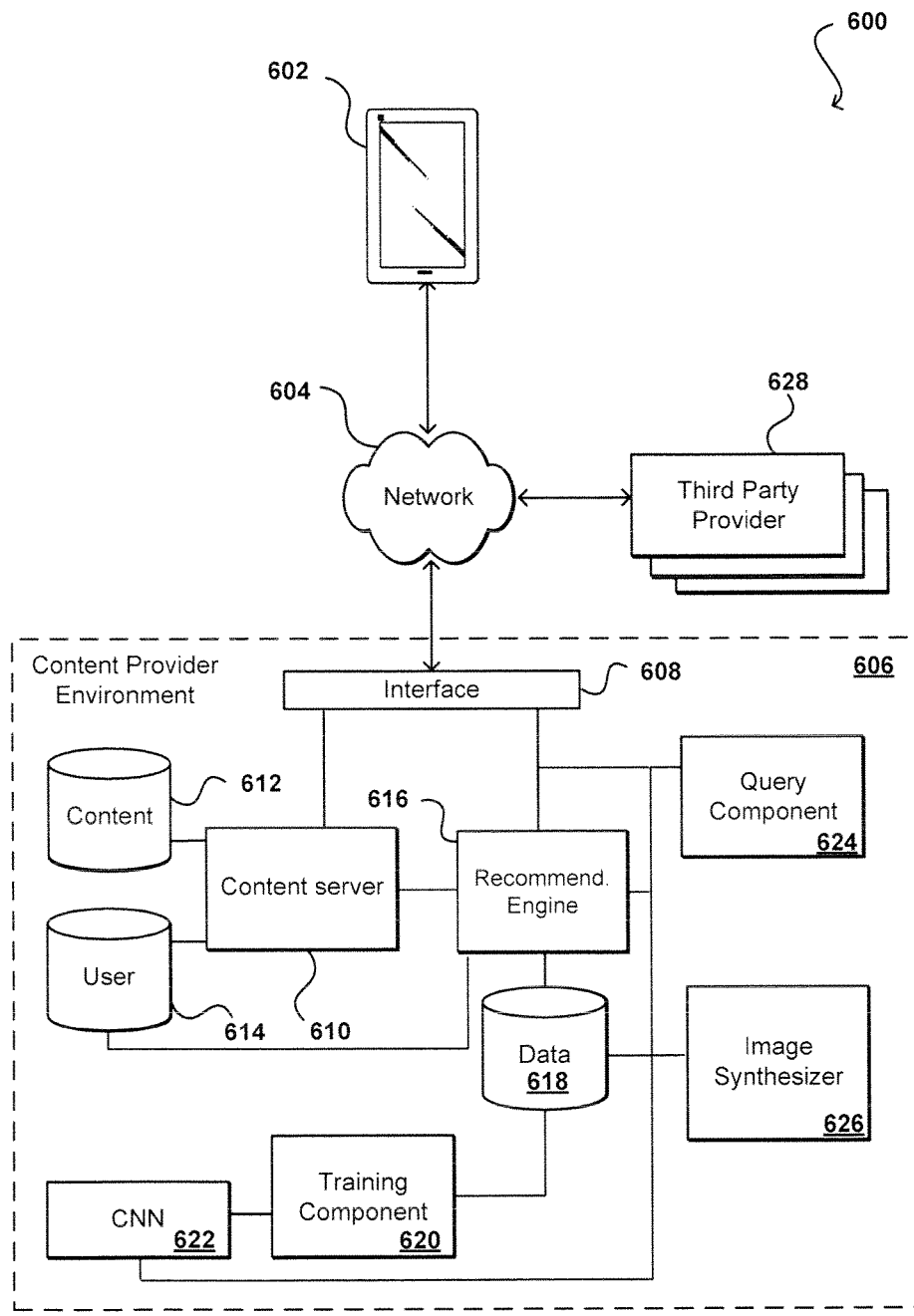
FIG. 6 illustrates an example system for synthesizing training data and using that data to train a content classifier for content location that can be utilized in accordance with various embodiments.

FIG. 6 illustrates an example environment 600 in which aspects of the various embodiments can be implemented. In this example, a computing device 602 is able to make a call or request across one or more networks 604 to a content provider environment 606. The network(s) can include any appropriate network, such as the Internet, a local area network (LAN), a cellular network, an Ethernet, or other such wired and/or wireless network. The content provider environment 606 can include any appropriate resources for providing content from a resource provider, as may include various servers, data stores, and other such components known or used for providing content from across a network (or from the "cloud").

In this example, a request received to the content provider environment 606 can be received by an interface layer 608 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 610 and/or content servers, which can obtain the content from a content data store 614 or other such repository to be sent back across the network(s) to the computing device. In some embodiments, information for the request might also be compared against user data in a user data store 612 or other such location do determine, for example, whether the user has access rights to that content. In some embodiments user data might also be analyzed to determine which type of content to provide, additional supplemental content to provide with the primary content, and the like.

In some embodiments a query image can be received from a client device 602 and directed to a query component 624, for example, which is configured to analyze the query image to attempt to recognize an item represented in the query image, or at least a type or classification of the item represented. Once determined, information for the item and/or classification can be provided to the content server 610 to determine the primary content to display in response to the query image. The information can also be provided to a recommendations engine 616 which can use the information, along with any other appropriate information, to recommend other items having that classification. As mentioned, this can take the form of search results, recommendations, or other related or secondary content. The content server 610 can then pull the content for the recommendations from a content data store 612, or other such location, to be provided to the client device 602.

The classification can be determined using a trained classifier, such as may utilize a convolutional neural network 622 or other such deep network or machine learning algorithm, etc. A training component 620 can perform the training on the models and provide the resulting results and/or trained models for use in determining the appropriate classifications. As discussed herein, an image synthesizer 626 can be used to generate at least some of the images used to train the convolutional neural network 622. As mentioned, for CNN-based approaches there can be images submitted that are classified by the type of item represented, while for GAN-based approaches a series of images may be submitted for training that may include metadata or other information useful in classifying items represented in each image. In certain embodiments, training a neural network may involve significant use of computation resources and time, such that this may correspond to a preparatory step to servicing search requests and/or performed relatively infrequently with respect to search request servicing and/or according to a schedule. In accordance with various embodiments, each image in the set of training images can be associated with at least one classification for an object depicted in the image or a subject represented in the image. According to some embodiments, training images and respective training object labels can be located in a data store 618 that includes images of a number of different objects.

Figure 7:
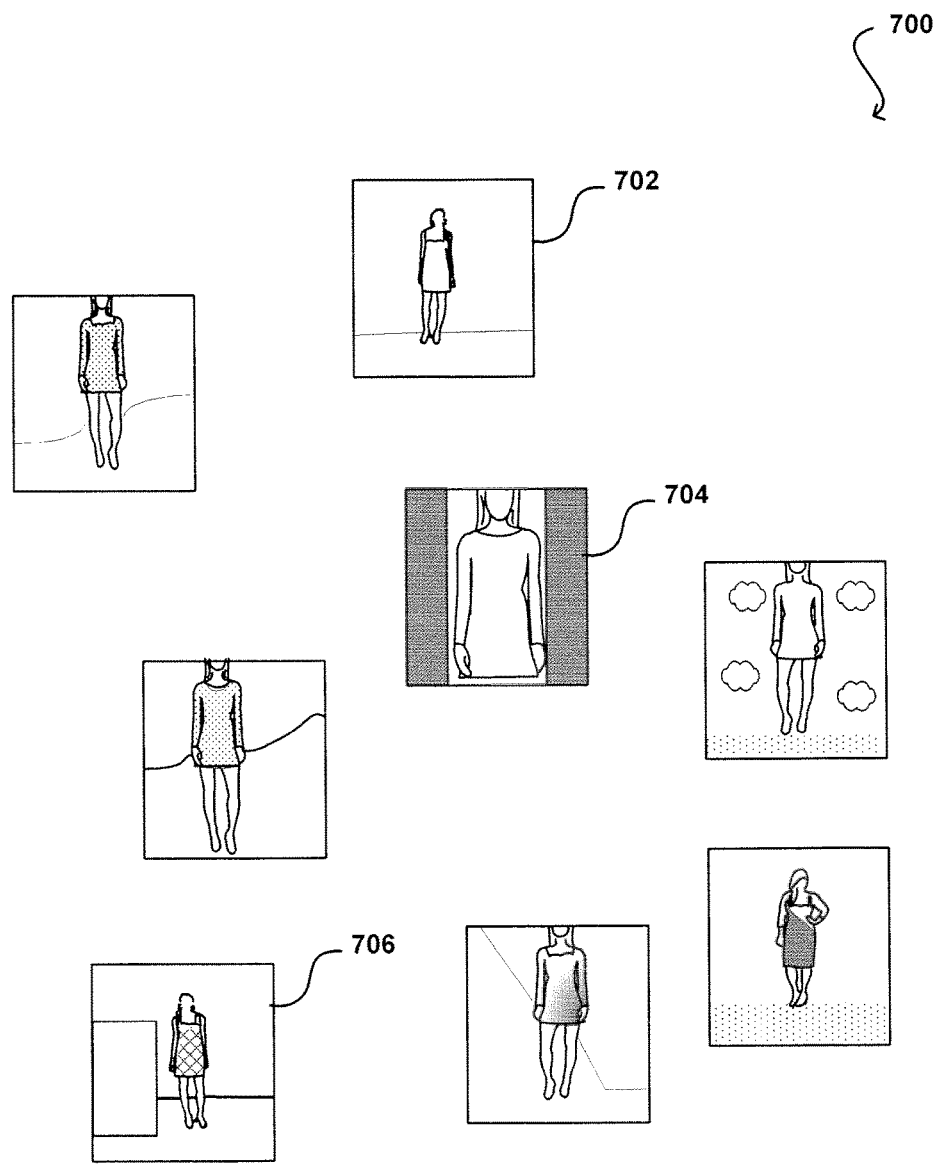
FIG. 7 illustrates an example set of synthesized training images that can be utilized in accordance with various embodiments.

A training component can utilize a training data set to train the neural network that contains a combination of real world and synthesized images, such as is illustrated by the set 700 of FIG. 7. This set includes a variety of images of different sizes and scales with a variety of different backgrounds as can be useful for training the neural network for different classifications. For example, some of the images

702, 706 show full representations of people wearing apparel items, while other images 704 show only portions of the wearer or specific item portions. Images 704 showing specific items or regions can have those images positioned at or near edges of the background in order to cause the images to appear more realistic. Various backgrounds can be utilized as well as discussed herein, such as images 706 with interior backgrounds as well as images 702 with outdoor backgrounds, among other such options. As mentioned, in some embodiments the type of background used might depend at least in part upon the type of item displayed, as certain items tend to be captured indoors versus outdoors, etc. As further described, neural networks can include several learning layers in their architecture. A query image from the training data set is analyzed using the neural network to extract a feature vector from the network before the classification layer. This feature vector describes the subject and/or objects shown in the image. This process can be implemented for each of the images in the data set, and the resulting object feature vectors can be stored in a data store. In various embodiments, the resulting object feature vectors can be compressed for improved processing. For example, the object feature vectors generated by the neural network may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

Figure 8:
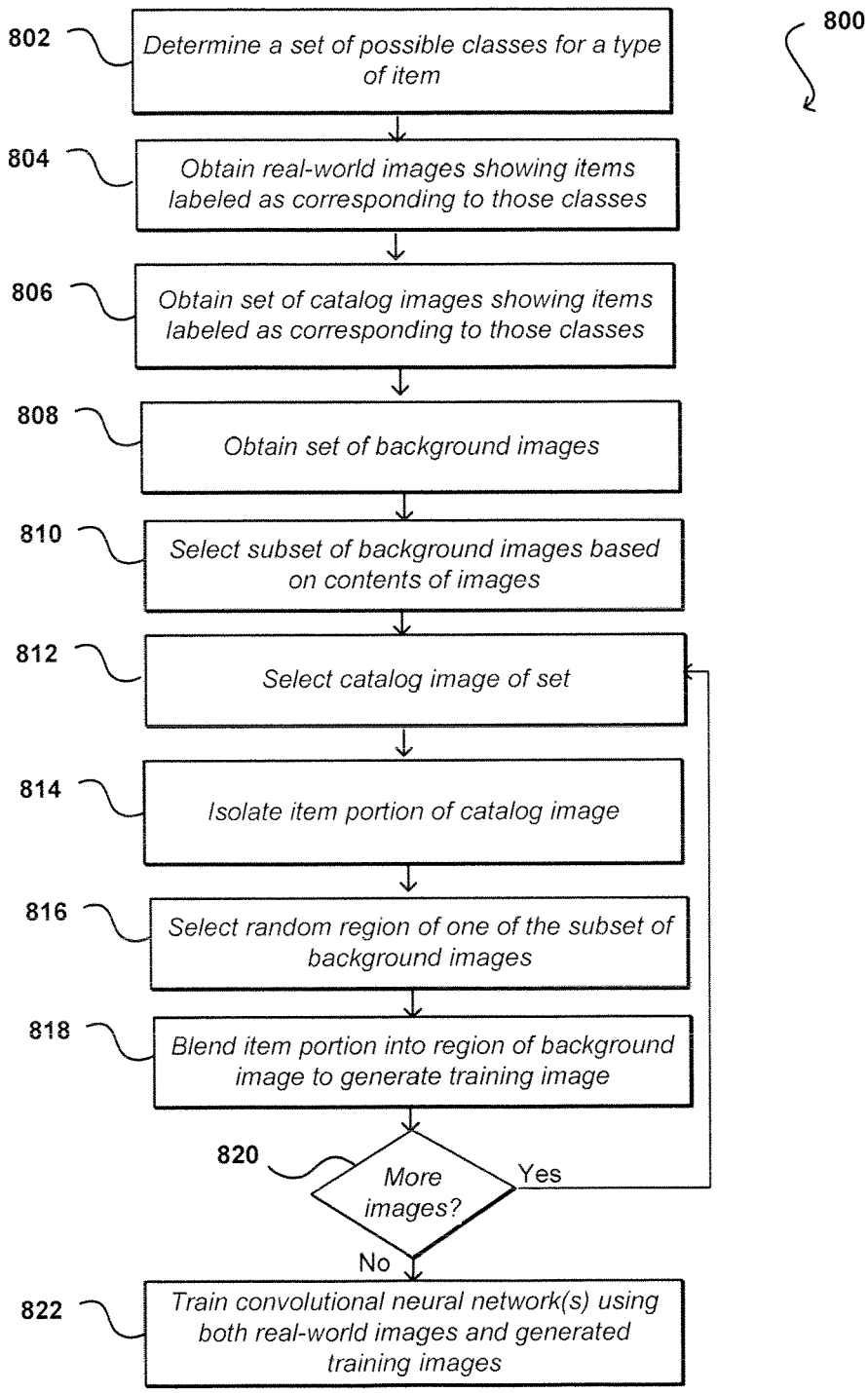
FIG. 8 illustrates an example process for training neural network using synthesized images and use that neural network to classify content that can be utilized in accordance with various embodiments.

FIG. 8 illustrates an example process 800 for obtaining images for training a neural network that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a set of possible classes is determined 802 for a type of item. This can include, for example, variations of a type of apparel item or other such object. A set or variety of real-world images can be obtained 804 that show items of those classes in real-world settings, as may have been captured by users or provided by other such entities. In addition, a set of catalog images is obtained 806 that also includes representations of those classes of objects. This can be from an electronic catalog maintained by a service provider or a third party, or from multiple sources, among other such options. Further, the images may not be related to a catalog but may come from one or more other types of image collections in accordance with various embodiments. For at least some of the images, such as a randomly selected subset or another such determination, text or other content associated with the images can be analyzed to determine whether one or more items represented in those images correspond to a classification for which a neural network is to be trained.

In addition to the items including representations of items, a set of background images can also be obtained 808. The background images can include representations of a number of different scenes, both indoors and outdoors, with a variety of types of scenes included. A subset of the background images can be selected 810 based at least in part upon the content of those images. As mentioned, the content can be determined based upon tags or metadata for the images, or by using object detection or facial recognition algorithms, among other such options. As mentioned, background images may be excluded from consideration if determined to include people, items, or other types of objects. For some of all of the catalog images, and in some cases the images may be processed more than once as discussed herein, a catalog image of the set is selected 812 for processing. During processing the item portion of the image can be determined and/or isolated 814 for use in generating at least one training image. A random region of one of the subset of background images can be selected 816 as a background for the synthesized image. The item portion can then be blended 818 into the background region to generate the synthesized training image. The process can continue as long as it is determined 820 that there are more images to process or an insufficient number of training images have been generated for all relevant classes, among other such criteria. Once the training images have been generated, at least one convolutional neural network, or other deep network, can be trained 822 using both the real-world and synthesized training images. As mentioned, in some embodiments a portion of the images will be retained for testing after the training of the neural network.

Figure 9:
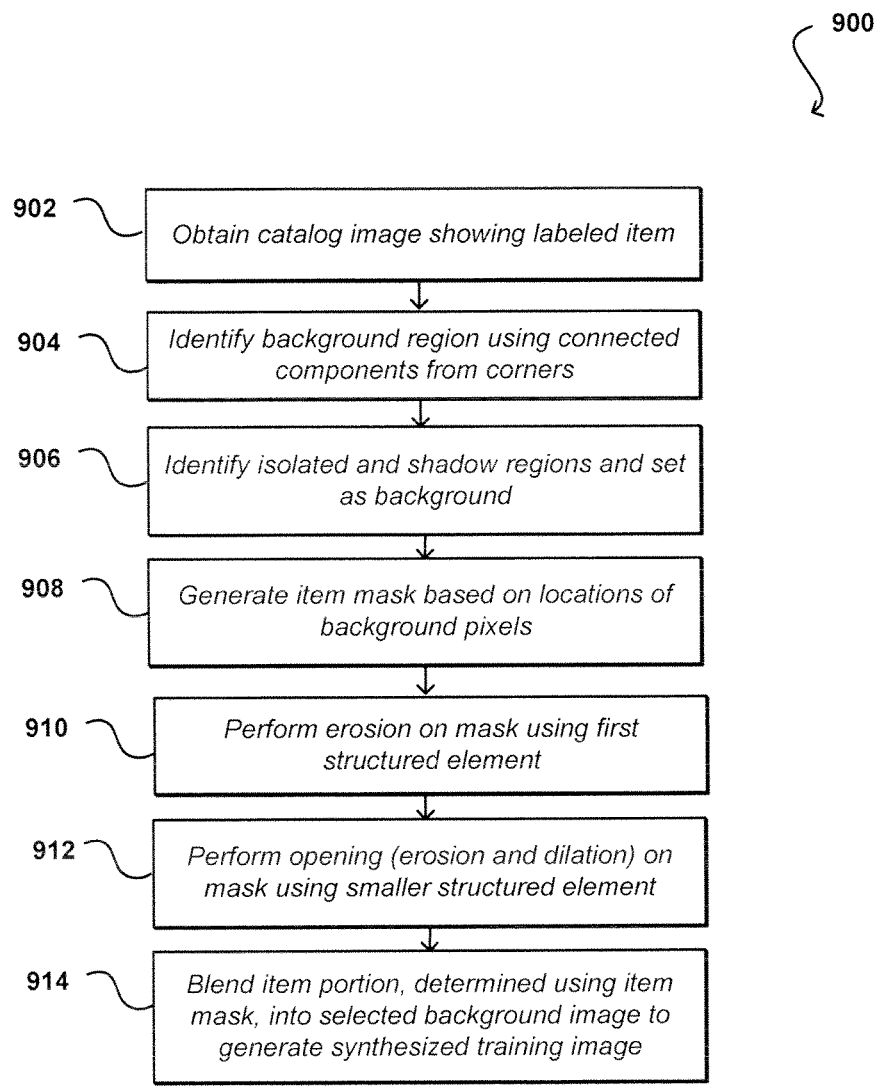
FIG. 9 illustrates an example process for synthesizing training data that can be utilized in accordance with various embodiments.

FIG. 9 illustrates an example process 900 for generating a synthesized training image that can be utilized in accordance with various embodiments. In this example a catalog image is obtained 902 that includes a representation of an item that has been labeled, where the class label can be provided through image metadata or another such mechanism. A background region or portion of the image can be identified 904 using a connected components approach starting at one or more edges or corners of the image. Further, isolated regions within the item representation and/or shadow regions can be identified 906 and designated as background regions as well. An item mask can then be generated 908 based upon the locations of the background pixels, as a binary mask would include discriminate between background pixel locations and non-background pixel locations, which could also be identified as item pixel locations. In order to remove spurious pixels from the item portion of the mask, and thus remove the presence of artifacts, a morphological operation such as an erosion can be performed 910 on the mask using a structuring element of a first size. This can include, for example, a circular element or tool that is of a diameter that is a fraction of the width of the mask. Subsequently, another morphological operation such as an opening, which is a second erosion followed by a dilation, can be performed 912 on the mask using a second structuring element that is smaller than the first structuring element. Both elements can be of the same general shape or different shapes in various embodiments. The item region or portion can be determined using the mask and then blended 914 into the selected background region to generate a synthesized training image that has minimal edge artifacts resulting from the item region selection.

Figure 10:
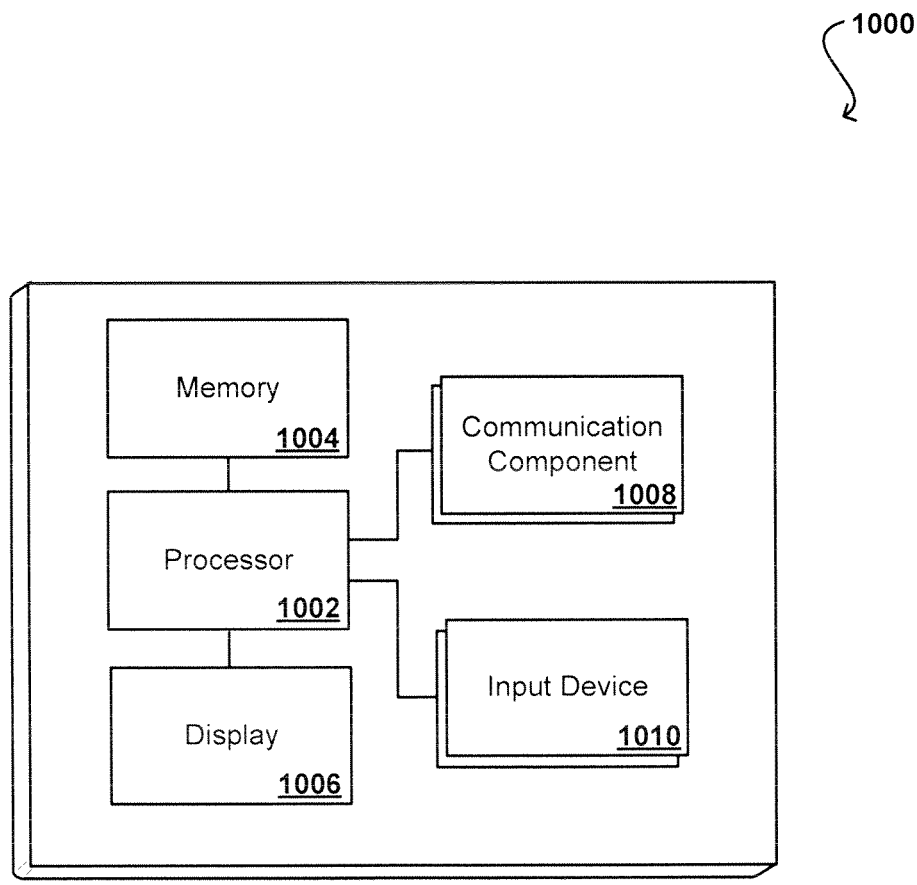
FIG. 10 illustrates example components of a computing device that can be utilized in accordance with various embodiments.

FIG. 10 illustrates a logical arrangement of a set of general components of an example computing device 1000 that can be used to implement aspects of the various embodiments. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one input element 1008 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1000 of FIG. 10 can include one or more network interface elements 1008 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining a set of classes corresponding to a type of item;
    obtaining a set of captured images including representations of items having labels corresponding to those classes and being in real world settings;
    obtaining a set of catalog images including representations of items against a solid color background and having labels corresponding to those classifications;
    obtaining a set of background images including representations of at least some of the real world settings;
    determining binary image masks identifying background regions, of the set of catalog images, having the solid background color, remaining portions of the set of catalog images representing item portions of the set of catalog images, pixels proximate edges of the items represented in the item portions including edge artifacts;
    processing edge regions of the binary image masks to reduce a number of the pixels corresponding to the edge artifacts included in the item portions;
    blending selected item portions, selected using the binary image masks, into the background images to create a set of synthesized training images;
    using the set of synthesized training images and the set of captured images to train a convolutional neural network for the type of item;
    receiving a query image including a specific representation of the type of item; processing the query image using the convolutional neural network to determine a corresponding classification for the specific representation; and
    providing information corresponding to the determined classification in response to the query image.

2. The computer-implemented method of claim 1, further comprising:
    selecting one or more morphological operations to be performed, the one or more morphological operations including at least one of erosion, dilation, or opening; and
    processing the edge regions of the binary image masks using the selected one or more morphological operations.

3. The computer-implemented method of claim 2, wherein the selected one or more morphological operations includes an erosion performed using a first structuring element and an opening performed using a second structuring element, the second structuring element having a same shape but a smaller dimension than the first structuring element, the smaller dimension being a fraction of a diameter of the binary image masks.

4. The computer-implemented method of claim 1, further comprising:
- randomly selecting a background layer corresponding to a sub-region of one of the background images;
- inserting a selected item portion as a top layer over the selected background layer; and
- performing an alpha blending of the top layer and the background layer to generate one of the synthesized training images.

5. The computer-implemented method of claim 1, further comprising:
- removing a background region of one of the catalog images by performing a connected components analysis, using the solid background color, from one or more corners of the catalog image.

6. A computer-implemented method, comprising:
- obtaining a first image including a representation of an item surrounded by a solid background color;
- identifying one or more background regions including background pixels having color values corresponding to the solid background color;
- generating an item mask including a background region corresponding to locations of the background pixels and a foreground region corresponding to other pixel locations;
- performing at least one morphological operation on the item mask to reduce a number of pixels of the foreground region corresponding to edge artifacts;
- blending an item portion of the first image, corresponding to the foreground region of the item mask, into a background image to generate a synthesized image including the representation of the item against selected background content of the background image; and
- providing the synthesized image for use in training a neural network.

7. The computer-implemented method of claim 6, further comprising:
- identifying at least one region of the first image corresponding to a shadow region or an isolated background region; and
- causing the at least one region to be included in the background region of the item mask corresponding to the solid background color.

8. The computer-implemented method of claim 6, further comprising:
- determining a value range proximate a color value of the solid background color; and
- identifying the background pixels having values corresponding to the solid background color as pixels having color values within the determined value range.

9. The computer-implemented method of claim 6, further comprising:
- selecting the at least one morphological operation to be performed, the at least one morphological operation corresponding to a morphological operation that includes at least one of erosion, dilation, or opening; and
- processing edge regions of the image mask using the selected at least one morphological operation.

10. The computer-implemented method of claim 9, wherein the selected at least one morphological operation includes an erosion performed using a first structuring element and an opening performed using a second structuring element.

11. The computer-implemented method of claim 10, wherein the second structuring element has a same shape but a smaller dimension than the first structuring element, the smaller dimension being a fraction of a diameter of the image mask.

12. The computer-implemented method of claim 6, further comprising:
- performing an alpha blending of the item portion of the first image, corresponding to the foreground region of the item mask, into the background image.

13. The computer-implemented method of claim 6, further comprising:
- selecting the background image from a plurality of background images;
- analyzing the background image to determine that the background image does not include a representation of an item or a person; and
- selecting a sub-region of the background image for use in generating the synthesized image.

14. The computer-implemented method of claim 13, wherein analyzing the background image includes at least one of processing image metadata, performing object recognition, or performing face recognition.

15. The computer-implemented method of claim 6, wherein the representation of the item is a three-dimensional representation.

16. The computer-implemented method of claim 6, further comprising:
- determining an affordance region of the background image; and
- placing the item portion into a background image using at least one of a location or a scale based at least in part upon the affordance region.

17. A system, comprising:
- at least one processor; and
- memory storing instructions that, when executed by the at least one processor, cause the system to:
  - obtain a first image including a representation of an item surrounded by a solid background color;
  - identify one or more background regions including background pixels having values corresponding to the solid background color;
  - generate an item mask including a background region corresponding to locations of the background pixels and a foreground region corresponding to other pixel locations;
  - perform at least one morphological operation on the item mask to reduce a number of pixels of the foreground region corresponding to edge artifacts;
  - blend an item portion of the first image, corresponding to the foreground region of the item mask, into a background image to generate a synthesized image including the representation of the item against selected background content of the background image; and
  - provide the synthesized image for use in training a neural network.

18. The system of claim 17, wherein the instructions when executed further cause the system to:
- select the at least one morphological operation to be performed, the at least one morphological operation including at least one of erosion, dilation, or opening; and
- process edge regions of the image mask using the selected at least one morphological operation.

19. The system of claim 18, wherein the selected at least one morphological operation includes an erosion performed using a first structuring element and an opening performed using a second structuring element, and wherein the second structuring element has a same shape but a smaller dimension than the first structuring element, the smaller dimension being a fraction of a diameter of the image mask.

20. The system of claim 17, wherein the instructions when executed further cause the system to:
perform an alpha blending of the item portion of the first image, corresponding to the foreground region of the item mask, into the background image.

* * * * *